(12) United States Patent
Engelen

(10) Patent No.: US 11,588,548 B2
(45) Date of Patent: Feb. 21, 2023

(54) MODEM-SATELLITE TRANSMISSION WITH DOPPLER CORRECTION AND E-SSA DEMODULATION

(71) Applicant: Magnitude Space B.V., Amsterdam (NL)

(72) Inventor: Maarten Johannes Engelen, Amsterdam (NL)

(73) Assignee: Hiber B.V., Amsterdam (NL)

(*) Notice: Subject to any disclaimer, the term of this patent is extended or adjusted under 35 U.S.C. 154(b) by 0 days.

(21) Appl. No.: 16/002,815

(22) Filed: Jun. 7, 2018

(65) Prior Publication Data
US 2019/0372659 A1   Dec. 5, 2019

(30) Foreign Application Priority Data

Jun. 4, 2018 (NL) ..................................... 2021054

(51) Int. Cl.
*H04B 7/216* (2006.01)
*H04B 7/185* (2006.01)
*H04B 7/195* (2006.01)

(52) U.S. Cl.
CPC ........... *H04B 7/216* (2013.01); *H04B 7/1858* (2013.01); *H04B 7/18513* (2013.01); *H04B 7/18515* (2013.01); *H04B 7/18517* (2013.01); *H04B 7/18582* (2013.01); *H04B 7/18584* (2013.01); *H04B 7/195* (2013.01)

(58) Field of Classification Search
CPC ............... H04B 7/185; H04B 7/18502; H04B 7/18504; H04B 7/18508; H04B 7/1851; H04B 7/18513; H04B 7/18515; H04B 7/18517; H04B 7/1858; H04B 7/18582; H04B 7/18584; H04B 7/195; H04B 7/2041; H04B 7/216; G01S 5/06; G01S 5/12; G01S 19/29; G01S 19/30; G01S 19/31; G01S 19/42; G01S 19/45; H04W 4/027; H04W 84/06; H04W 40/20
See application file for complete search history.

(56) References Cited

U.S. PATENT DOCUMENTS

| 6,058,306 | A | 5/2000 | Liu |
| 6,317,029 | B1* | 11/2001 | Fleeter ................. H04B 7/1851 455/12.1 |
| 7,299,013 | B2 | 11/2007 | Rotta et al. |
| 7,679,551 | B2 | 3/2010 | Petovello et al. |
| 7,990,874 | B2 | 8/2011 | del Rio Herrero et al. |

(Continued)

*Primary Examiner* — Peter Chen
(74) *Attorney, Agent, or Firm* — Jordan IP Law, LLC; Todd A. Vaughn

(57) ABSTRACT

A device in a population of devices arranged at a celestial body for transmitting data to a relay station orbiting the celestial body. The relay station and the population of devices are to travel with respect to one another such that the relay station is to receive signals that include the data in data packages from the population of devices. The device includes trajectory data of the relay station, a transmitter to use the trajectory data so as to transmit a signal that is part of the signals, a data processor, and a computer program which, when executing on the data processor, is to calculate a Doppler shift based upon the trajectory data, and modify the signal to thereby compensate for the Doppler shift of the signal that results from the travelling of the relay station and the population of devices with respect to one another.

6 Claims, 6 Drawing Sheets

(56) References Cited

U.S. PATENT DOCUMENTS

Figure 1A:
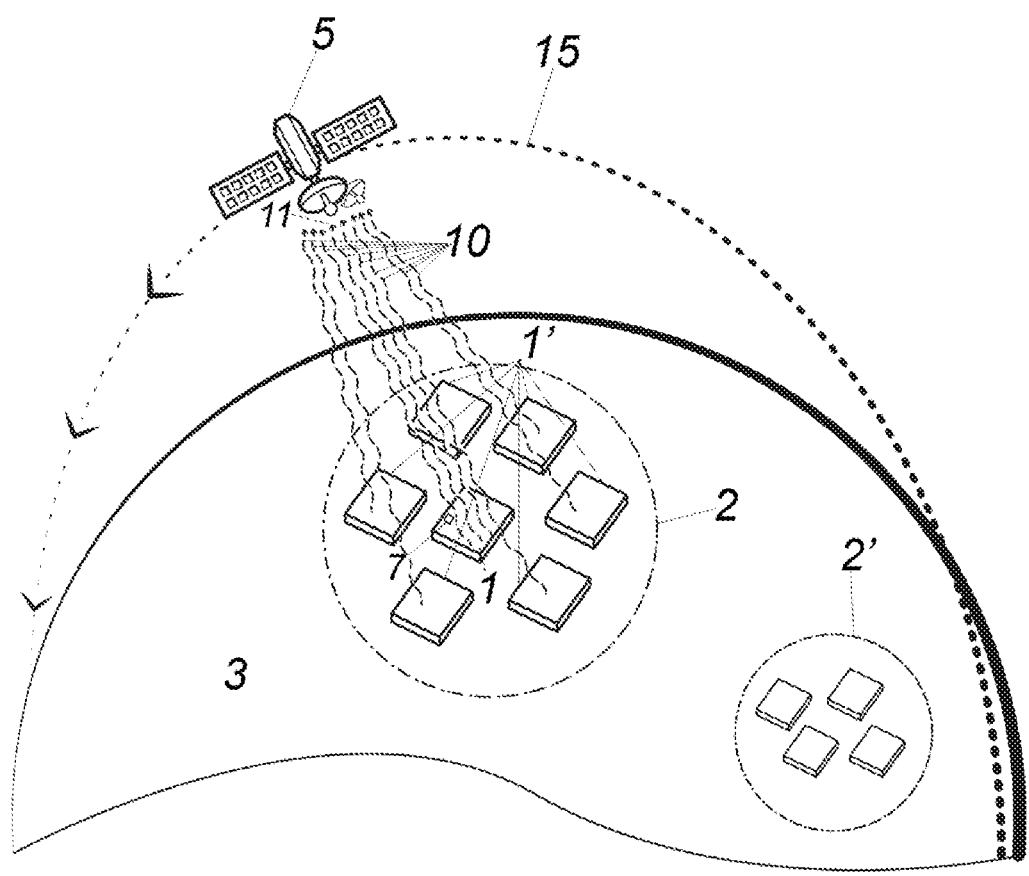

| | | | |
|---|---|---|---|
| 2015/0351043 A1* | 12/2015 | De Gaudenzi | H04W 52/10 |
| | | | 370/329 |
| 2016/0278033 A1* | 9/2016 | Wu | H04B 7/18502 |
| 2019/0337643 A1* | 11/2019 | Giraud | H04B 7/18521 |
| 2019/0372656 A1* | 12/2019 | Fang | H01Q 1/288 |

* cited by examiner

MODEM-SATELLITE TRANSMISSION WITH DOPPLER CORRECTION AND E-SSA DEMODULATION

CROSS-REFERENCE TO RELATED APPLICATIONS

The present application claims priority to Dutch Patent Publication No. 2021054 (filed on Jun. 4, 2018), which is hereby incorporated by reference in its entirety.

TECHNICAL FIELD

The invention relates to a relay station orbiting a celestial body for receiving data from a population of devices arranged at the celestial body, a method for receiving data, transmitted from a population of devices, on a relay station orbiting a celestial body, and a computer program product for executing on a data processor on a relay station orbiting a celestial body.

The invention further relates to a device in a population of devices arranged at a celestial body for transmitting data to a relay station orbiting said celestial body, to a method for transmitting part of data from a device to a relay station, and a computer program product for transmitting part of data from a device to a relay station.

BACKGROUND

Satellites are orbiting around the world gathering data, via data connections, from a growing number of devices (such as modems) on earth. Every satellite is limited in regard the number of data connections it can handle simultaneously. Therefore, when a satellite passes an area with a lot of devices, which all at the same time interval want to setup a data connection, congestion problems can occur. More in general congestion problems occur when too many devices in a network want to connect to the same device at more or less the same time. A system, wherein a satellite receives signals from modems on earth while moving at high speed, needs to cope with Doppler shifts when it processes and relays data. When done efficiently congestion problems can be avoided.

U.S. Pat. No. 7,299,013 according to its abstract describes: "A system and method for correcting for Doppler shift in transmitted and received electromagnetic wave, light wave, or acoustic wave signals between two platforms, where at least one of the platforms is moving relative to the other. The system involves determining a Doppler shift that affects the frequency of a signal being transmitted from a transmitting platform, as a result of motion of the transmitting platform, and adjusting the frequency of the transmitted signal to cancel out the determined degree of Doppler shift that will be experienced by the receiving platform. If the receiving platform is also moving, then a determination is made as to the Doppler shift that will be imparted to the signal being received because of motion of the receiving platform. A receiver on the receiving platform is controlled to account for this degree of Doppler shift. Therefore, the Doppler shift components attributable to the motion of each, or both, platforms is accounted for."

U.S. Pat. No. 7,990,874 according to its abstract describes: "A method of receiving data packets asynchronously transmitted by a plurality of user terminals using a spread-spectrum medium access protocol, comprises a step of cancelling interferences between colliding packets according to an innovative "sliding window" processing algorithm. A gateway receiver is adapted for carrying out interference cancellation using this algorithm. Asynchronous packet transmission from a user terminal is controlled by estimating a parameter indicative of the quality of information transmission through a communication channel; and inhibiting or allowing data transmission depending on a comparison between said estimated parameter and an adaptively varying threshold. A user terminal comprises transmission control means adapted for carrying out such a method. A communication system comprises a plurality of mobile user terminal communicating with a gateway through a satellite channel using an asynchronous spread-spectrum medium access protocol without closed-loop power control, wherein the user terminals and said gateway are of the kind described above."

U.S. Pat. No. 7,679,551 according to its abstract describes: "Embodiments of the invention provide a method for effecting Doppler removal and correlation for software-based receivers. For one embodiment of the invention Doppler removal is performed concurrently for all received communications signals. For one embodiment of the invention, a single frequency selected to effect Doppler removal, multiple communications signals having Doppler frequency shift are received from corresponding communications signal sources, and a Doppler removal process is performed concurrently for each received communication signal. A correlation process is then performed, the correlation process having an integration interval divided into multiple sub-intervals."

U.S. Pat. No. 6,058,306 according to its abstract describes: "A communication system and a method of providing a feeder link to an earth orbiting satellite transponder having a mobile link illuminating spot beams with associated access channels, control channels and traffic channels for multiple user terminals (UTs) using the satellite transponder as the reference point to correct for dynamic frequency errors including the Doppler in the feeder link and in the mobile link caused by the satellite motion and the satellite translation error. A satellite access node (SAN) includes one or several radio frequency terminals (RFTs) and a satellite basestation subsystem (SBS). The RFT performs the center Doppler correction for each of the channels of the feeder link to the satellite transponder. The SBS corrects the feeder link residual Doppler and the satellite translation error for each channel and calculates the Doppler in the mobile link between the satellite transponder and the median Doppler line of each spot beam on the earth or each UT. The SBS measures the differential Doppler of the UT relative to the median Doppler line and derives its fractional Doppler, and uses the fractional Doppler to determine the position of the UT and calculate its Doppler of the traffic channels in the mobile link. The UT corrects the mobile link Doppler under the guidance of the SBS."

SUMMARY

A disadvantage of prior art is that data transmission between devices and relay stations require much transmission power and/or suffer from difficulties in the transmission and receipt of data.

Furthermore or alternatively, transmission of data between a population of devices, relay stations and servers can be improved.

Hence, it is an aspect of the invention to provide an improved and/or alternative relay stations, devices and systems for transmitting data, which preferably further at least partly obviates one or more of above-described drawbacks.

There is currently provided a device in a population of devices arranged at a celestial body for transmitting data to a relay station orbiting said celestial body, said relay station and said population of devices travelling with respect to one another, wherein said relay station receives signals from said population of devices, said signals comprising said data in data packages, wherein said device comprises trajectory data of said relay station, a transmitter using said trajectory data to transmit a signal that is part of said signals, a data processor and a computer program which, when executing on said data processor, calculates a Doppler shift based upon said trajectory data, and said device is configured to modify said signal for compensating a Doppler shift of said signal that results from said travelling with respect to one another.

There is further provided a method for transmitting part of data from a device to a relay station, wherein said part of data is transmitted by a device that forms part of a population of devices transmitting data, said population of devices transmitting said data to a relay station orbiting a celestial body, said relay station and said devices travelling with respect to one another, and which includes: transmitting a signal to said relay station, said signal forming part of signals transmitted by devices in said population of devices, said signal comprising signal data in data packages that is at least part of said data, said device comprising trajectory data of said relay station; calculating, via said device, a Doppler shift based upon said trajectory data, and modifying, via said device, said signal for compensating a Doppler shift of said signal that results from said travelling with respect to one another.

There is further provided computer program product for transmitting part of data from a device to a relay station, said device forming part of a population of devices, said population of devices and said relay station travelling with respect to one another, said population of devices arranged at a celestial body, and said population of devices transmitting data to said relay station while it is orbiting said celestial body, wherein said computer program product when executing on a data processor on said device is to: transmit a signal to said relay station, said signal forming part of signals transmitted by said devices in said population of devices, said signal comprising signal data in data packages and that is at least part of said part of data, said device comprises trajectory data of said relay station; calculate a Doppler shift based upon said trajectory data; and modify said signal for compensating a Doppler shift of said signal that results from said travelling with respect to one another.

There is further provided a relay station orbiting a celestial body for receiving data from a population of devices on said celestial body, said relay station and said devices travelling with respect to one another, wherein: said relay station comprises a receiver for receiving signals from said devices; said signals comprises a signal that is part of said signals; said signal comprises signal data in data packages that are at least part of said data; said relay station comprises a signal-processing device for receiving said signal from said receiver and extracting said signal data from said signal; said signal-processing device set for correcting said signal for a positive Doppler shift or set for correcting said signal for a negative Doppler shift; and said relay station comprises a transmitter for transmitting said signal data from said signal processing device to a server remote from said relay station, in particular to said server remote on said celestial body.

There is further provided a method for receiving data, transmitted from a population of devices, on a relay station orbiting a celestial body, said relay station and said devices travelling with respect to one another, and which includes: receiving, by said relay station, signals from said devices, said signals comprising a signal that is part of said signals, said signals comprising signal data in data packages that is at least part of said data, said relay station receiving said signals; setting, via said relay station, a signal processing device in said relay station for correcting a positive Doppler shift or for correcting a negative Doppler shift in said signal, resulting in a corrected signal; extracting said data from said data packages from said corrected signal in said signal processing device; and storing said data on a data storage device on said relay station.

There is further provided computer program product for executing on a data processor on a relay station orbiting a celestial body, said computer program when executing on said data processor transmitting data received from a population of devices on said celestial body to a sever remote from said relay station, wherein said computer program product when executing on said data processor, is to: receive signals from said devices, said signals comprising a signal comprising signal data in data packages that is at least part of said data; control a signal-processing device for extracting said signal data from said signal; extract said signal data from said signal; store said signal data on a data storage; transmit said signal data from said data storage to said remote server, and set said signal-processing device for correcting said signal for a positive Doppler shift or for correcting said signal for a negative Doppler shift.

The relay station, device, method and computer programs allow use of low amounts of power. Part of the lower power can be realized in that less power is used per transmission, as accuracy increases. The device can be a so-called modem. In an embodiment, the device comprises its own power source, and a measurement sensor for measuring at least one physical parameter. The device or modem in such an embodiment is substantially self-supporting. It can send its measurement data to the relay station. In an embodiment, the device or modem is located on the earth, and the relay station is a satellite circling the earth.

A population of devices comprises a series of devices that are spaced apart and within an area on the celestial body. Usually, the interspacing of these devices is substantially smaller than the area. The devices can form a group. For instance, the devices can measure the same parameter of parameters, and be assigned to send their measurement data to the same relay station. They can be used for instance for getting an insight to a variations or fluctuations or change of a certain parameter in a certain area of land. In an embodiment, devices in a population may coordinate, or be set to coordinate, their data transmission to one or more relay stations. They may for instance be set to transmit at different intervals or times with respect to one another.

In an aspect, a population of devices is a plurality of devices that is substantially or functionally within a footprint of said relay station.

In an embodiment of the relay station, the signal-processing device is set for correcting said positive or said negative Doppler shift, based upon a population information on said relay station.

In an embodiment of the relay station, the population information is based upon a location of said population of devices.

In an embodiment of the relay station, the signal-processing device is set for correcting said positive or said negative Doppler shift, based upon a location of said device. The differentiation between positive and negative Doppler shift can at least save half the amount of calculation time.

In an embodiment of the relay station, the signal-processing device comprises a demodulator, in particular, a demodulator using Enhanced Spread Spectrum Aloha (E-SSA).

In an embodiment of the relay station, the signal-processing device comprises a series of parallel correlators and each correlator representing a different, predefined frequency range shift for finding a Doppler shift in said signals. In this embodiment of the relay station, for finding a data header in said signal, said parallel correlators correlate said signal with at least part of said data header.

In an embodiment of the relay station, the parallel correlators subsequently correlate said signal with subsequently larger parts of said data header.

In an embodiment of the relay station, the signal-processing device is adapted for filtering out received other signals. In this embodiment of the relay station, the signal-processing device is arranged for filtering out said other signals by detecting a Doppler shift which is statistically unlikely to result from said travelling of said relay station and said devices with respect to one another.

In an embodiment of the relay station, the relay station comprises a data storage device for storing said signal data, and said transmitter for transmitting said signal data from said data storage to said server. The data storage allows the relay station to process and resend the clean data. It also allows the relay station to wait for a better moment to send data to a (ground) server. Thus, transmitting power can be reduced and quality improved. The relay station may be smaller.

In an embodiment of the relay station, the relay station and said population of devices have relative speed of 1-10 km/s resulting in a frequency shift of 1-100 KHz, in particular 5-50 KHz, more in particular between 10 and 20 KHz.

In an embodiment of the relay station, in use said relay station orbits at an orbit height below a geostationary orbit, in particular, in a low earth orbit (LEO).

There is further provided a data transmission system comprising at least one of the relay stations orbiting a celestial body, a series of populations of devices, and at least one server, said server provided remotely from said relay station, in particular said server provided on said celestial body In an embodiment of the data transmission system, a device of said devices comprises trajectory data of said relay station; said device configured to transmit a signal that is part of said signals and using said trajectory data to transmit said signal, and modify said signal for compensating a Doppler shift of said signal that results from said travelling with respect to one another.

In an embodiment of the data transmission system, a frequency of transmission of said signal is modified to correct said Doppler shift, based upon the position of said relay station and the relative speed of said relay station at reception of said signal by said relay station.

In an embodiment of the data transmission system, the device uses said trajectory data to either transmit said signal when said relay station is moving towards said device or is moving away from said device.

In an embodiment of the method for receiving data on said relay station, the relay station further transmit said data to a server remote from said relay station, in particular said server being located on said celestial body, said relay station transmitting said data from said data storage to said server using a transmitter, in particular said server being located remote from said relay station on said celestial body.

In an embodiment of this method, the signal-processing device comprises demodulating said signal, in particular, demodulating using Enhanced Spread Spectrum Aloha (E-SSA).

In an embodiment of the method, in use said relay station orbits at an orbit height below a geostationary orbit, in particular, in a low earth orbit (LEO).

In an embodiment of the device, the computer program sets said transmitter for modifying a frequency of transmission of said signal to correct said Doppler shift, based upon at least one selected from the position of said relay station, the relative speed of said relay station at a reception of said signal by said relay station, and a combination thereof.

In an embodiment of the device, the computer program uses said trajectory data to set said transmitter to either transmit said signal when said relay station is moving towards said relay station or is moving away from said relay station.

In an embodiment of the device, the transmitter comprises a modulator, in particular, an Enhanced Spread Spectrum Aloha (E-SSA) modulator.

In an embodiment of the method for transmitting part of data from a device to a relay station, the transmitter comprises modulating, in particular, modulating according to Enhanced Spread Spectrum Aloha (E-SSA).

In an embodiment, the computer program product executing on said relay station is provided for finding a data header in said signal, said computer program product correlates said signal with a part of said data header.

In an embodiment, on-board E-SSA (Enhanced Spread Spectrum Aloha) demodulation at a satellite, orbiting earth, allows for effective use of a frequency spectrum when many devices on earth, such as modems, transmit small messages to the satellite. When a satellite, such as a LEO (low earth orbit) satellite, is flying with high speed, a lot of Doppler interference will occur during transmission between the satellite and devices on earth. As a result, the satellite will receive many signals comprising messages with different Doppler shifts ranging up to thousands of Hertz; typically between 10-20 KHz. The E-SSA protocol has resilience to Doppler shift limited to a few hundred Hertz. In order to identify signals and messages with different Doppler shifts, the satellite includes an embodiment of the invention executing a computer program on a processor that stores incoming signals in buckets of a few hundred Hertz in which, in parallel, signals are analyzed for finding a matching data header.

To limit the processing on board of the satellite, modems use trajectory data of the satellite and use their relative position to the satellite to only send when the satellite is either moving towards or away from them.

Because all modems are in a certain region and regions are split up in either to send during approach or withdrawal of the satellite relative to the modem position, only half the amount of possible Doppler shifts (either received frequencies are equal to or higher than the base frequency or equal or lower) need to be processed by the embodiment.

Modems can send signals with a (slightly) different frequency to (partly) correct a Doppler shift at reception of a signal by a satellite, by calculating the relative speed of the satellite with respect to the modems.

A positive Doppler shift will occur when a relay station (such as the satellite) and a device (such as a modem) are moving towards each other. As a result, a reflected wave of a signal transmitted between the relay station and the device will have a higher frequency then its origin. Transmitting the signal at a lower frequency then its origin can compensate for this shift.

A negative Doppler shift will occur when a relay station (such as the satellite) and a device (such as a modem) are moving away from each other. As a result, a reflected wave of a signal transmitted between the relay station and the device will have a lower frequency then its origin. Transmitting the signal at a higher frequency then its origin can compensate for this shift.

To further limit the processing on board of the satellite, an embodiment with a signal-processing device at the satellite uses preamble detection, by digital analyzing the received signals, that is crude. This can detect and filter out signals with Doppler shifts which are statistically unlikely to contain a data header of a signal sent by a modem. Preamble detection can consist of multiple steps wherein in each step the digital analyzing is less crude and more refined.

While it is common to use the E-SSA protocol with ground demodulators on earth, a satellite comprising a further embodiment demodulates received signals functionally real-time, extracts data from data packages and sends the extracted data (not the received raw signals) down to a ground station and server. Therefore, bandwidth is utilized with increased efficiency since the overhead of the E-SSA protocol is avoided in a downlink and only the data is relayed by using a transmission protocol with less overhead.

In a further embodiment, a satellite can store the extracted data for later transmission by a downlink. For instance, a LEO satellite might store the extracted data and waits with transmission over a downlink until a specific ground station is within its footprint or downlink beam. In another example a LEO satellite waits with transmission until it gathered data from various modem populations located on different locations.

A server is a computer or device that can handle digital data and that is operationally connected to a ground station or any device that is able to receive signals from a relay station and demodulates these signals in digital data.

Such a server may be one server device, for instance a computer device, located at a location. Alternatively, a server may refer to at least one server device, connected via one or more data connections, at the same location and/or located at remote, in particular, physically/geographically remote locations. Each separate server may run part of the system. For instance, one of the databases may run on a separate, even a physically or geographically remote, server device. Thus, a server may be part of a distributed system of computer devices.

The term "statistically" when used herein, relates to dealing with the collection, analysis, interpretation, presentation, and organization of data. In particular, it comprises modelling behavior of a population. Using probability distributions, a probability of optimizing transmission reliability is calculated and predicted.

The term "substantially", such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

DRAWINGS

Figure 1B:
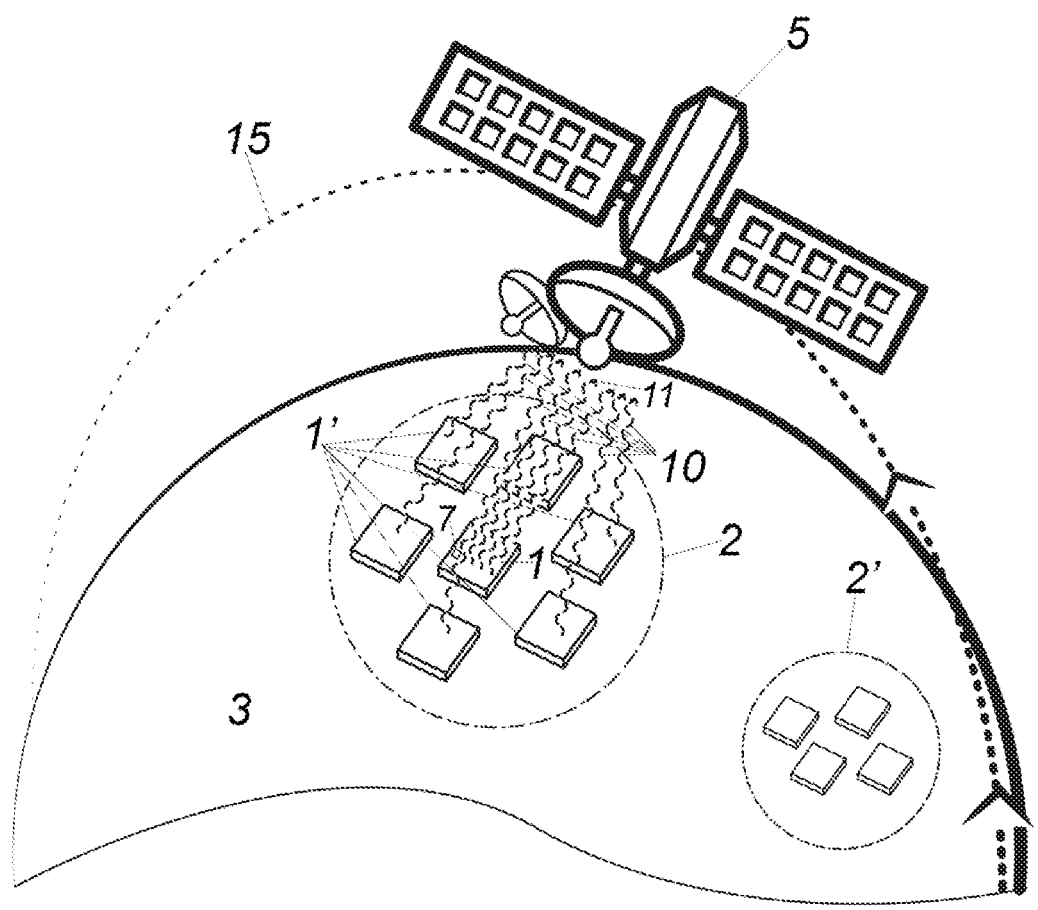

Embodiments of the invention will now be described, by way of example only, with reference to the accompanying schematic drawings (which are not necessarily drawn to scale) in which corresponding reference symbols indicate corresponding parts, and in which:

FIGS. 1A and 1B schematically depict an embodiment of a modem in a population of modems transmitting data to a satellite.

Figure 2:
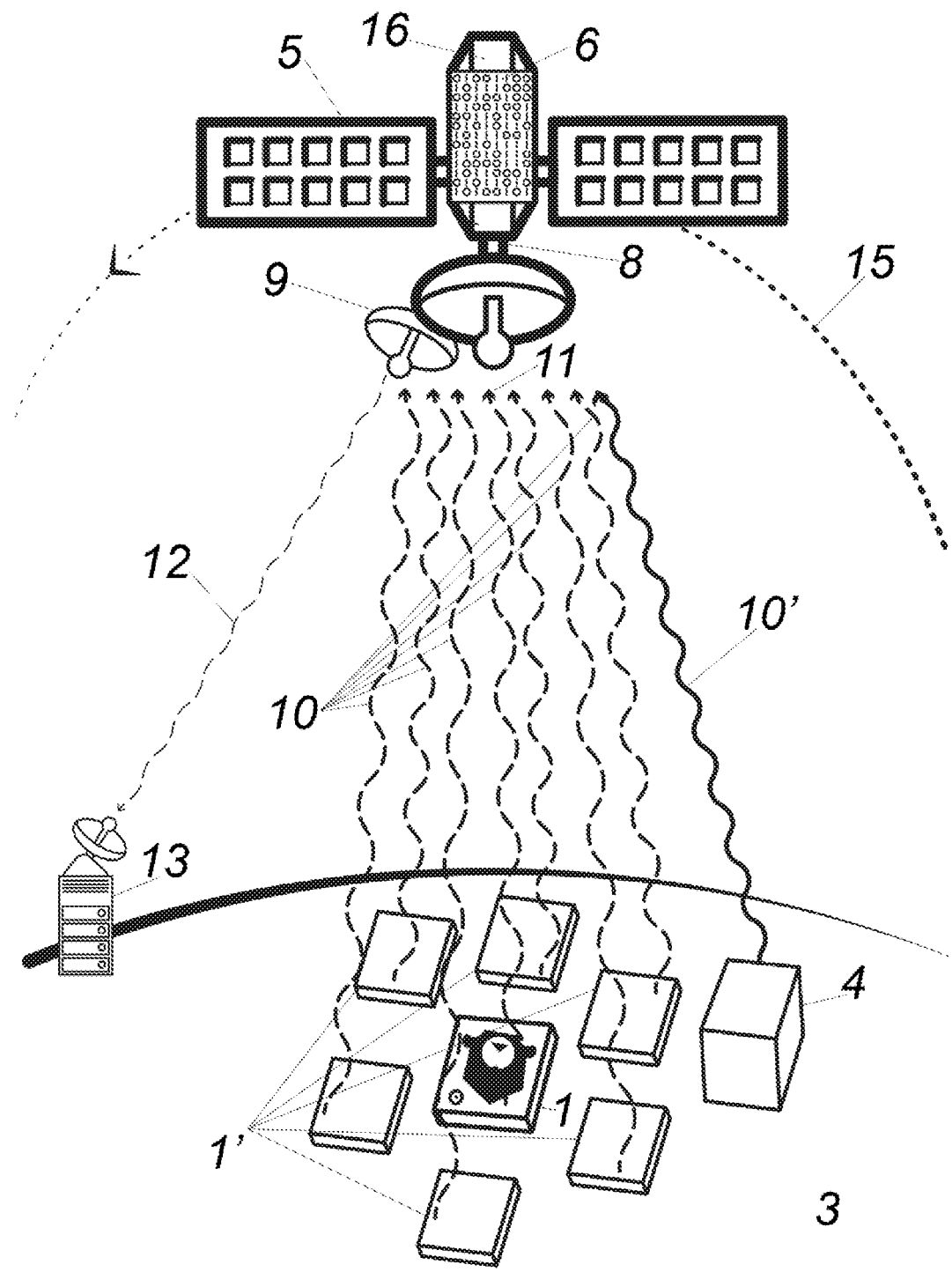

FIG. 2 schematically depicts an embodiment of a system transferring data from a population of modems to a remote server.

Figure 3A:
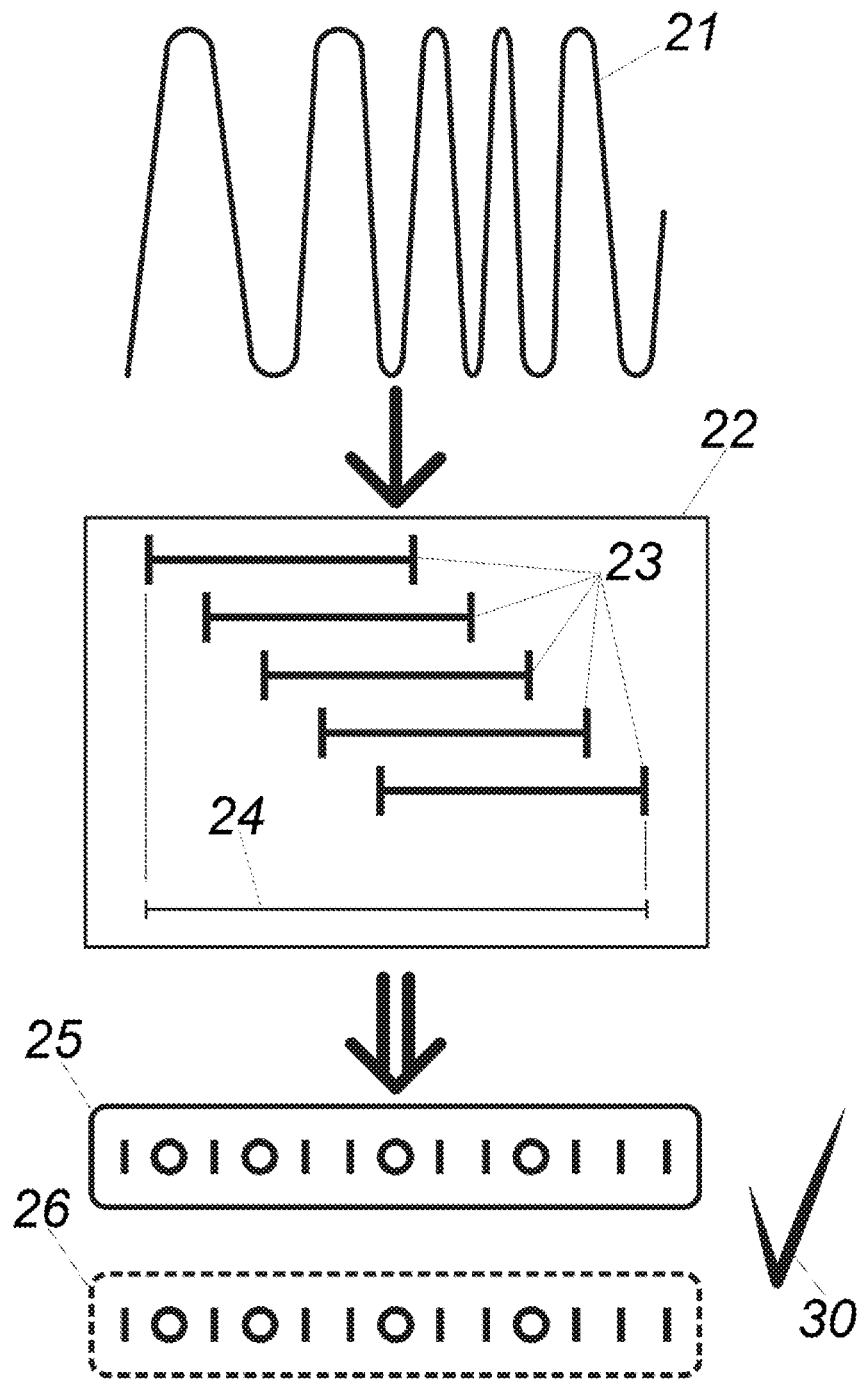
Figure 3B:
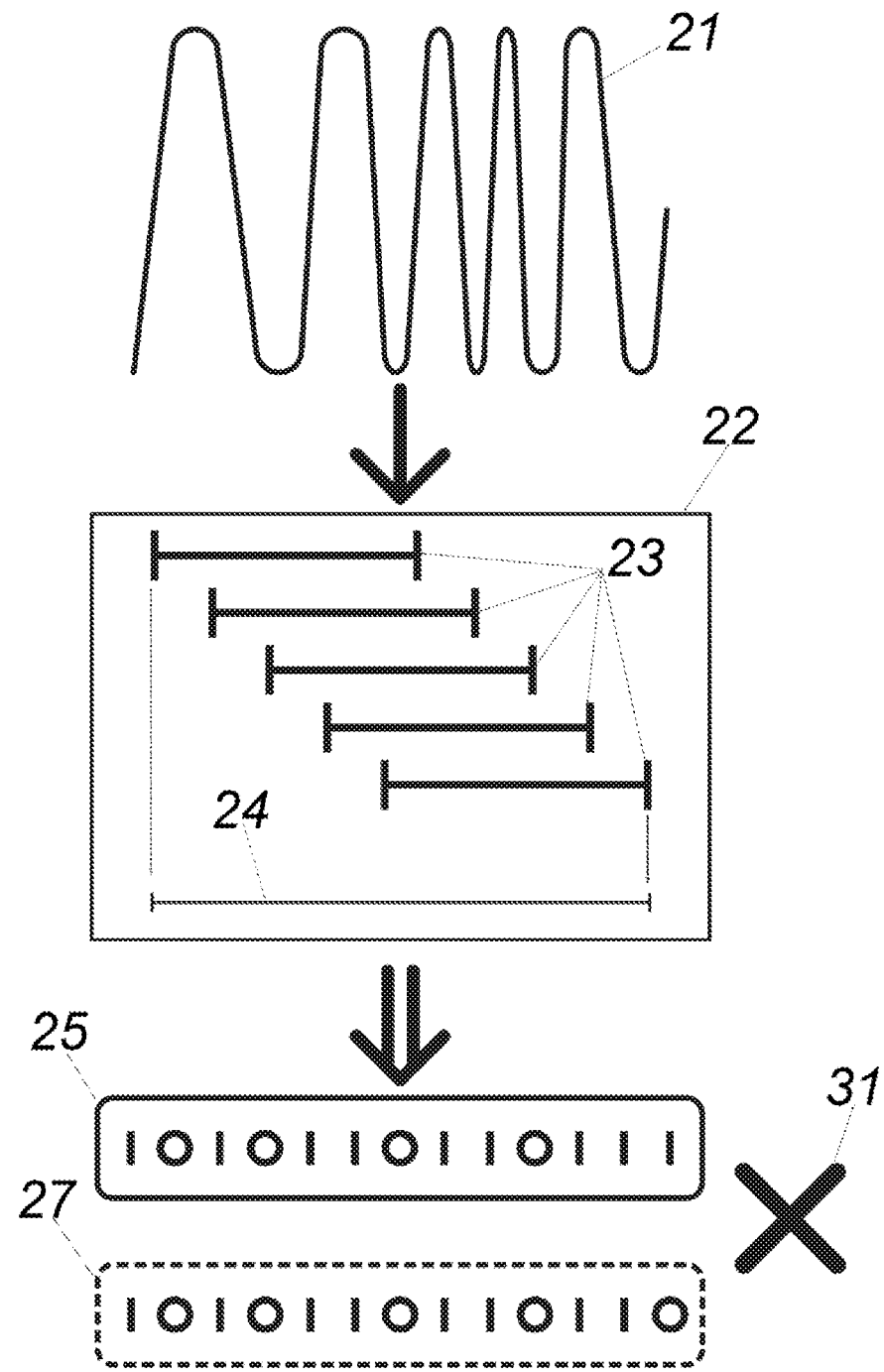
Figure 3C:
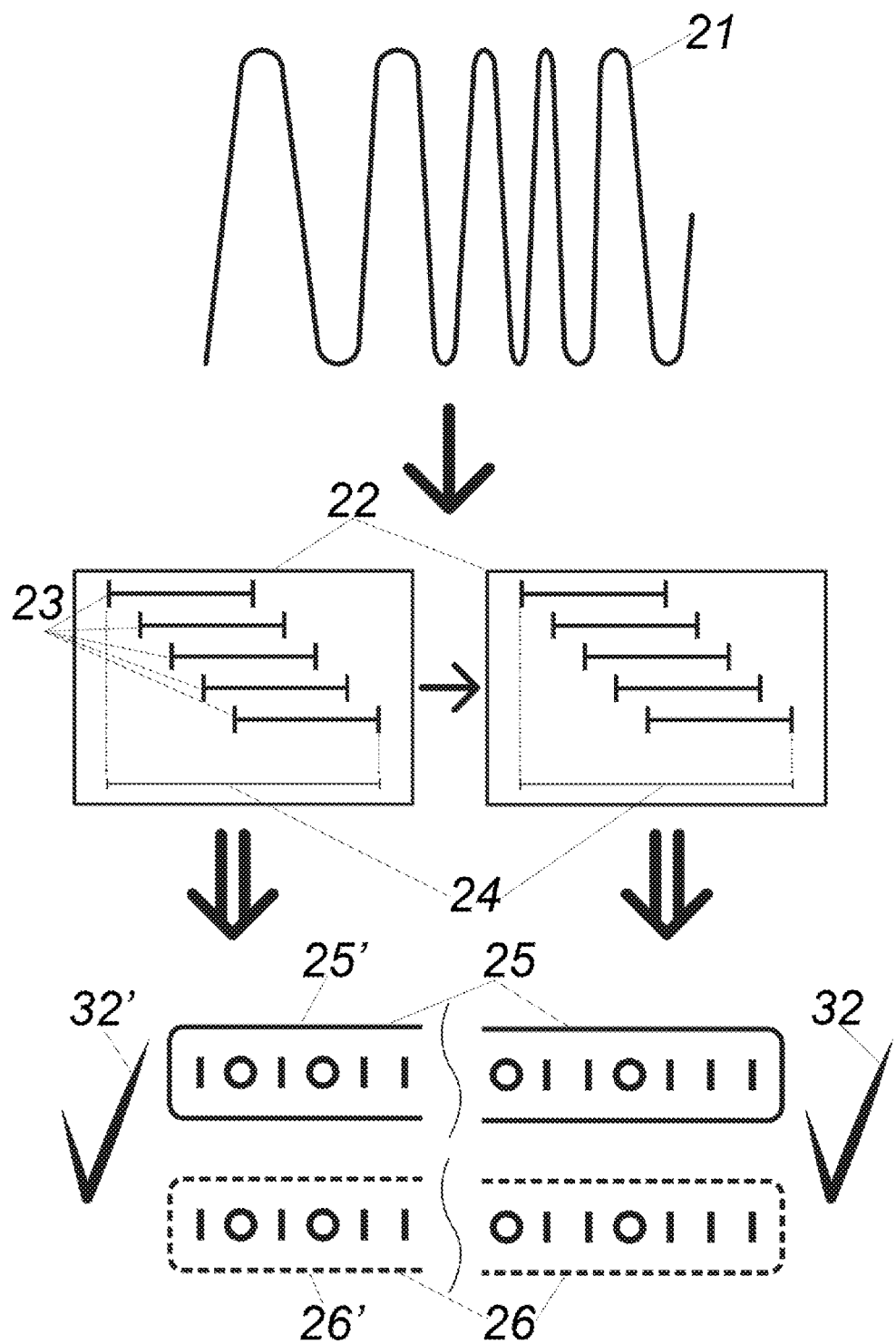

FIGS. 3A to 3C schematically depict an embodiment of a signal-processing device correlating a signal to a data header.

DESCRIPTION

FIGS. 1A and 1B schematically depict an embodiment of a modem 1 in a first population of modems 2 that also includes other modems 1' and a second population of modems 2'. The second population of modems 2 is to transmit signal(s) 10, and modem 1, having a data processor 7, is to transmit a signal(s) 11 while a satellite 5 is to orbit earth 3 along a trajectory 15.

As illustrated in FIG. 1A, the modem 1 and satellite 5 are moving away from each other which causes a negative Doppler shift in a transmission of the signal(s) 10, 11. Modem 1 is to calculate, via the execution of a computer program on a data processor 7, the negative Doppler shift and compensates for this shift by transmitting signal(s) 11 at a higher frequency. The modem 1 may even apply a varying frequency shifts that substantially or functionally compensates for the Doppler shift.

As illustrated in FIG. 1B the modem 1 and satellite 5 are moving towards each other which causes a positive Doppler shift in a transmission of the signals 10 and 11. Modem 1 calculates, via the execution of a computer program on a data processor 7, the positive Doppler shift and compensates for this shift by transmitting signal 11 at a lower frequency.

FIG. 2 schematically depicts an embodiment of a satellite 5 comprising a receiver 8, a transmitter 9, a signal-processing device 6 and a data storage 16. The satellite is to orbit earth 3 along a trajectory 15. The satellite 5 is to receive, from the modem 1 in a population of modems 1', signals 10 including a signal 11 comprising signal data in data packages. The satellite 5 is to also receive other signals 10 from a second device 4. After receiving the signal data, satellite 5 is to transmit a signal 12 comprising the received signal data to a server 13. In an embodiment, the transmitter and receiver may also be combined.

FIG. 3A to 3C schematically depict an embodiment of a signal-processing device 22 configured to correlate incoming signals with known headers or part of known headers. The signal processing device comprises a series of correlators 23 extending along parallel planes. Each correlator 23 represents a different, predefined frequency range shift. For finding a Doppler shift within a specific frequency range 24, a signal 21 that may comprise a header 25, is correlated to a known header 26, 27, or part thereof. The correlating can result in a match 30, 32' and 32", or can result in a no-match indication 31.

As illustrated in FIG. 3A, the signal-processing device 22 is to correlate a signal 21 through the series of correlators 23, and is to compare the deducted header 25 with (at least part of) the known header 26, resulting in a match 30.

As illustrated in FIG. 3B, the signal-processing device 22 is to correlate a signal 21 through the series of correlators 23, and is to compare the deducted header 25 with the different known header 27, resulting in a no-match 31.

As illustrated in FIG. 3C, the signal-processing device 22 is to correlate a signal 21 through a series of correlators 23, and is to first compare only a part of a deducted header 25' with a part of a known header 26', resulting in a match 32'. Since there is a match 32', subsequently, the signal-processing device 22 correlates signal 21 again and now compares the full deducted header 25 with the full known header 26, resulting in a match 32. When there would be no match in result 32', subsequent correlating would not be needed since this would indicate a signal of no interest.

Correlating first a part of a known header (such as, for example, header 26 and header 27 in FIG. 3B) limits processing resources to be used on signals of no interest, such as signals 10' in FIG. 2.

In a further embodiment correlating a known header can be done in multiple steps by comparing subsequently larger parts of the known header.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent. The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A device in population of devices arranged spaced apart within an area on earth, and which are to transmit data to a low earth orbit (LEO) satellite orbiting earth, said LEO satellite to receive signals from said population of devices, said signals including the data in data packages, the device comprising:
    a transmitter configured to transmit a signal that is part of said signals;
    a data processor and a computer program which, when executing on said data processor, is to: calculate a relative speed of the LEO satellite with respect to the device, calculate a Doppler shift based upon trajectory data of said LEO satellite, modify said signal to thereby compensate for the Doppler shift of said signal that results from said LEO satellite and said population of devices travelling with respect to one another, use said trajectory data of said LEO satellite and use a relative position of said device to said LEO satellite to reduce transmission power by only transmitting the signal when said LEO satellite is either moving towards said population of devices or moving away from said population of devices, and set said transmitter to modify a frequency of transmission of said signal to correct said Doppler shift based upon a position of said LEO satellite and the calculated relative speed of said LEO satellite at a reception of said signal by said LEO satellite, wherein, in response to calculating a positive Doppler shift, said computer program is configured to compensate for the Doppler shift of said signal by transmitting the signal at a lower frequency than its origin frequency, and wherein, in response to calculating a negative Doppler shift, said computer program is configured to compensate for the Doppler shift of said signal by transmitting the signal at a higher frequency than its origin frequency.

2. The device of claim 1, wherein said computer program is further configured to use said trajectory data to set said transmitter to either transmit said signal when said LEO satellite is moving towards said population of devices, or is moving away from said population of devices.

3. The device of claim 1, wherein said transmitter comprises a modulator.

4. The device of claim 3, wherein said modulator comprises an Enhanced Spread Spectrum Aloha (E-SSA) modulator.

5. A method for transmitting a part of data to a low earth orbit (LEO) satellite orbiting earth, the method comprising:

transmitting, via a device arranged on earth and which includes trajectory data of said LEO satellite, a signal to said LEO satellite, said device forming part of a population of devices that are arranged spaced apart within an area on earth, and said LEO satellite and said population of devices are configured to travel with respect to one another, wherein said signal forms part of signals transmitted by said population of devices, and includes signal data in data packages that is at least part of said data;

calculating a relative speed of the LEO satellite with respect to the device;

calculating, via said device, a Doppler shift based upon said trajectory data;

modifying, via said device, said signal to thereby compensate a Doppler shift of said signal that results from said LEO satellite and said population of devices travelling with respect to one another;

reducing transmission power by transmitting, using said trajectory data of said LEO satellite and using a relative position of said device to said LEO satellite, only when said LEO satellite is either moving towards said population of devices or moving away from said population of devices; and modify a frequency of transmission of said signal to correct said Doppler shift based upon a position of said LEO satellite and the calculated relative speed of said LEO satellite at a reception of said signal by said LEO satellite, wherein, in response to calculating a positive Doppler shift, compensating for the Doppler shift of said signal comprises transmitting the signal at a lower frequency than its origin frequency, and wherein, in response to calculating a negative Doppler shift, compensating for the Doppler shift of said signal comprises transmitting the signal at a higher frequency than its origin frequency.

6. A non-transitory computer program product for transmitting part of data from a device to a low earth orbit (LEO) satellite orbiting earth, said device forming part of a population of devices arranged spaced apart within an area on earth and includes trajectory data of said LEO satellite, said population of devices and said LEO satellite travelling with respect to one another, and said population of devices configured to transmit data to said LEO satellite while said LEO satellite is orbiting earth, wherein said non-transitory computer program product, when executing on a data processor on said device, is to:

transmit, a signal to said LEO satellite, said signal forming part of signals transmitted by devices in said population of devices, said signal including signal data in data packages that is at least part of said part of data;

calculate a relative speed of the LEO satellite with respect to the device;

calculate a Doppler shift based upon said trajectory data;

modify said signal to thereby compensate a Doppler shift of said signal that results from said LEO satellite and said population of devices travelling with respect to one another;

reduce transmission power by transmitting, using said trajectory data of said LEO satellite and using a relative position of said device to said LEO satellite, only when said LEO satellite is either moving towards said population of devices or moving away from said population of devices; and modify a frequency of transmission of said signal to correct said Doppler shift based upon a position of said LEO satellite and the calculated relative speed of said LEO satellite at a reception of said signal by said LEO satellite, wherein, in response to calculating a positive Doppler shift, compensating for the Doppler shift of said signal comprises transmitting the signal at a lower frequency than its origin frequency, and wherein, in response to calculating a negative Doppler shift, compensating for the Doppler shift of said signal comprises transmitting the signal at a higher frequency than its origin frequency.

* * * * *